United States Patent Office 3,345,338
Patented Oct. 3, 1967

3,345,338
POLYURETHANES PREPARED FROM
AMINO POLYESTERS
Rudolf Merten, Cologne-Flittard, and Otto Bayer, Leverkusen-Bayerwerk, Germany, assignors to Farbenfabriken Bayer Aktiengesellschaft, Leverkusen, Germany, a German corporation
No Drawing. Filed Aug. 9, 1963, Ser. No. 301,184
Claims priority, application Germany, Aug. 11, 1962, F 37,572
6 Claims. (Cl. 260—75)

This invention relates to novel organic compositions and their methods of preparation. More specifically, this invention resides in novel amino ester compositions.

It is known to prepare polyurethane plastics from organic polyisocyanates and hydroxyl-bearing materials such as polyethers, polyesters etc. Generally, these polyurethanes have desirable physical properties, but these physical properties are to a large extent dependent upon the hydroxyl material used. Many of the polyurethane foams made have poor absorption properties and in many instances exhibit brittleness and poor adhesion properties. Also, there have been many coatings and elastomeric compositions made from polyurethanes which have low resistance to moisture and solvents. It has also been known to use various substituted hydroxy compounds which provide polyurethane compositions having selective improved properties; however, many of these improvements are only obtained by sacrificing other qualities in the product.

It is, therefore, an object of this invention to provide a novel hydroxyl-bearing material which may be reacted with a polyisocyanate to form a polyurethane. A further object of this invention is to provide a novel polyester composition which may be used to produce polyurethanes having desirable physical properties. Another object of this invention is to provide a process for the production of novel polyester compositions. A still further object of this invention is to provide a novel polyurethane composition by using the above-noted polyester. A still further object of this invention is to provide a novel method for making polyurethanes having good water absorbing properties. A yet still further object of this invention is to provide a method for making polyurethane foams which have a low degree of brittleness, good adhesive properties and low tendency to shrinkage. Still a further object of this invention is to provide a process for the production of polyurethane compositions whereby a lower temperature of reaction is required and little or no reaction catalyst is needed. Still a further object of this invention is to provide a process for the manufacture of polyurethane foams whereby said foams have good deformation properties, desirable tensile strength and a low tendency to shrinkage. A yet still further object of this invention is to provide a process for the manufacture of polyurethane coatings having a high resistance to solvents.

The foregoing objects and others which will become apparent from the following description are accomplished in accordance with the invention, generally speaking, by providing a novel amino ester obtained by a process which comprises reacting with an α,β-unsaturated polyester a composition containing an amine unit having the formula:

wherein R is selected from the group consisting of hydrogen and an organic radical and whereby at least one R is an organic radical. By reacting a polyisocyanate with said above amino ester, polyurethane materials having desirable physical properties are obtained. Addition products of primary and/or secondary amines with α,β-unsaturated polyesters are provided by the present invention.

The addition of the primary or secondary amines to the unsaturated polyesters leads to the formation of modified polyesters which show an increased reactivity in the reaction with isocyanates because of the presence of the secondary or tertiary amino group and generally do not require an amine catalyst, for example, during a foaming. Secondary amino groups react very quickly with the isocyanate component and, for example, when producing a foam material, lead to a stabilization of the foaming process and when producing lacquers and molded elements lead to a more rapid curing.

The polyesters required for this purpose are obtained by esterifying or transesterifying an α,β-unsaturated monocarboxylic and/or polycarboxylic acid or derivatives thereof, if desired together with other saturated monocarboxylic and/or polycarboxylic acids, with polyfunctional alcohols. The esterification is carried out under the usual conditions, for example, at about 130 to 210° C. with the addition of stabilizers (such as tert. butyl pyrocatechol or hydroquinone) under an inert gas and/or in the presence of esterifying or transesterifying catalysts.

For the introduction of the α,β-unsaturated carbonic ester function, there are considered the various types of α,β-unsaturated monocarboxylic and/or polycarboxylic acids and their derivatives, such as, maleic acid, fumaric acid, maleic acid anhydride, maleic acid dimethyl ester, fumaric acid diethyl ester, itaconic acid, aconitic acid, chloromaleic acid, acrylic acid, acrylic acid ethylester, methacrylic acid, mesaconic acid, citraconic acid and glutaconic acid. It is necessary to provide for α,β-unsaturation, since the amino group will add only to double bonds in an α,β-position, with isolated unactivated double bonds addition will not occur.

As well as the α,β-unsaturated carboxylic acids, it is possible, in addition, to use other saturated and unsaturated carboxylic acids in the esterification, such as succinic, sebacic, adipic, glutaric, azelaic, phthalic, isophthalic, terephthalic, trimellitic acids, dimerized and trimerized unsaturated fatty acids, oleic stearic, ethyl caproic acids, technical fatty acid mixtures such as tall oil, train oil or linseed oil fatty acids and many others.

Examples of polyhydric alcohols for the esterification are dihydric and higher polyhydric alcohols of aliphatic, cycloaliphatic, aromatic or heterocyclic nature, such as ethylene glycol, diethylene glycol, triethylene glycol, polyethylene glycol, propylene glycol, dipropylene glycol, tripropylene glycol, propane-1,3-diol, butane-1,2-diol, butane-1,3-diol, butane-1,4-diol and butane-2,3-diol, hexane-2,5-diol or hexane-1,6-diol, octadecane diol and acetadecene diol, butene-1,4-diol and butine-1,4-diol, glycerine, trimethylol ethane, trimethylol propane, pentaerythritol, hexane triols, mannitol, sorbitol, glucose, fructose, mannose, cane sugar, invert sugar, solutions of invert sugar in polyalcohols, degraded starches, cyclohexane-1,4-dimethanol, oxyalkylated hydroquinone or diphenylol alkanes and also amino alcohols such as triethanol amine, oxyalkylated ethylene diamines or phenylene diamines. The polyhydric alcohols used can also be of relatively high molecular weight, such as, castor oil, polyethylene glycols of molecular weight 400, 600 or 2000, polypropylene glycols ethers or the adducts of propylene oxide and polyfunctional starting molecules with molecular weights up to about 3000. In addition, polyesters produced by copolymerization of anhydrides with alkylene oxides according to U.S. patent specification 2,822,350 can also be used.

The proportions used in the production of the polyester are so chosen that the α,β-unsaturated polyesters have a low acid number as far as possible below about 20; it is also possible to use stoichiometric quantities of acids and alcohol in those cases in which the polyfunctional nature of the molecule is produced by a modification with primary amines or polyamines. In general, the esters should contain at least one unsaturated grouping per molecule. A low amine content is advantageous when producing soft foam materials, whereas high amine contents and branches may be advantageous with hard foam materials.

The α,β-unsaturated polyesters to be reacted with the amine should generally have a molecular weight within the range of from 200 to 4000 and OH numbers from about 30 to 1200, preferably from about 50 to 600. The increase of molecular weight after addition of the amine is negligible. The OH number can be increased or as well decreased by the addition of the amine. The preferred OH number is between 50 and 600.

Amines of different natures are used for modifying the polyesters, temperatures of about 20 to 80° C. generally being employed for the addition of the primary amines and temperatures of about 20 to 140° C. with secondary amines. If required, the modification is also effected in inert solvents, e.g. alcohols such as methanol or aliphatic or aromatic hydrocarbons.

Monoamines and/or polyamines can be used as the amines for addition to the α,β-unsaturated polyesters; compounds with several amino groups can react several times depending on reaction conditions and proportions. The following are mentioned as examples of the amines: methylamine, ethylamine, butylamine, allylamine, octadecylamine, tallamine, isobutylamine, cyclohexylamine, ethanol amine, α-amino-propionitrile, aniline, toluidine, aminodiphenylmethane, furfurylamine, amino-pyridine, condensation products of fatty acids and diethylene triamine or triethylene-tetramine, ethylene diamine, hexamethylene diamine, p-phenylene diamine, hexahydro-p-phenylene diamine, hydrogenation products of the adducts of acrylonitrile and monohydric alcohols and polyhydric alcohols, monoamines and polyamines, toluylene-diamine, dimethyl amine, dibutyl amine, diethanolamine, pyrrolidine, piperidine and morpholine. Amines with a pronounced basic character are advantageous.

The proportions between amine and α,β-unsaturated groupings are so adjusted that up to about 100 mol percent of amine, based on α,β-unsaturated groupings, are introduced. With polyamines, higher proportions of amine can be used.

According to one particular form, addition products of primary amines which have also been reacted with alkylene oxides are with α,β-unsaturated esters or nitriles can be used for the process according to the invention. For this purpose, the addition products which are obtained with primary amines and which contain secondary amino groups may be modified with ethylene oxide, propylene oxide, butylene oxide or styrene oxide if desired at temperatures between about 20 and 140° C. and possibly with concurrent use of inert solvents. Another possibility of modification comprises the addition of, for example, acrylonitrile, methacrylonitrile, acrylic acid ethyl ester or methacrylic acid ethyl ester at temperatures of, for example, about 50 to 120° C. By the use of such still further modified addition products, the mechanical properties of the plastics obtainable according to the invention can be varied.

According to another embodiment of the invention, there are used addition products which have also been reacted wtih alkylation agents, for example, with methyl iodide, benzyl chloride or diethyl sulphate. In this way, quaternary salts, for example, can be obtained and thus ionic groups which, for example, impart improved water absorption and exchanger capacity to a foam material produced by the process of the invention with the use of an addition product modified in this way.

The polyesters thus obtained containing at least two reactive hydrogen atoms in the molecule, i.e., the starting materials for the process according to the invention, are light yellow to brown substances which are generally of low viscosity and which are reacted together with polyisocyanates and also possibly with chain extenders, crosslinking agents and/or blowing agents. They can, also, be mixed with other known polyhydroxyl compounds such as polyesters, polyethers, polythioethers, polyacetals, adducts of alkylene oxide and polyamines, and alkoxylated phosphoric acids.

Preferred α,β-unsaturated polyesters are prepared from maleic acid and its anhydride and ethylene glycol, diethylene glycol, triethylene glycol. Preferred amines to be added are cyclohexyl amine, methyl amine, butyl amine and ethylene diamine. The addition products can then be propoxylated. Typical materials are the addition products of cyclohexyl amine to the polyester of maleic anhydride and diethylene glycol and the addition product of ethylene diamine to the polyester of maleic anhydride and ethylene glycol. Both polyesters can be further reacted with propylene oxide.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate,
ethylidene diisocyanate,
propylene-1,2-diisocyanate,
cyclohexylene-1,2-diisocyanate,
m-phenylene diisocyanate,
2,4-toluylene diisocyanate,
2,6-toluylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
p,p',p''-triphenylmethane triisocyanate,
1,5-naphthalene diisocyanate,
furfurylidene diisocyanate, or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

Those polyisocyanates which may be reacted with less than equivalent quantities of polyhydroxyl compounds and which are substituted by various substituents, such as OR, $NO_2$, Cl such as trimethylol propane, hexanetriol, glycerine and butane diol. Also to be mentioned are, for example, polyisocyanates masked with phenols or bisulphite, acetal-modified isocyanates and also polymerized isocyanates with isocyanurate rings.

The quantities of polyisocyanate should generally be at least equivalent to the sum of reactive hydrogen atoms which are present. When using water as blowing agent, suitable quantities of excess isocyanate calculated also on the water content will be used. On the other hand, excessive proportions of isocyanate groups can be incorporated by polymerization reactions or secondary addition reactions into the plastic structure. Instead of or in addition to, the foaming with water, it is also possible to use other blowing agents such as azo-compounds, low-boiling hydrocarbons, halogenated methanes or ethanes or vinylidene chloride.

A foaming is preferably carried out in the presence of catalysts, for example, amines such as triethylamine, dimethyl benzylamine, 1-dimethylamino-3-ethoxy-propane, triethylene diamine or metal salts such as tin-(II)-acylates, dialkyl-tin-(IV)-acylates, acetyl-acetonates of heavy metals, or molybdenum glycolate. Other additives are emulsifiers, such as hydroxy ethylated phenols or biphenylols, higher sulphonic acids, sulphuric acid esters of castor oil or ricinoleic acid, ammonium salts of oleic acid, foam stabilizers such as alkylene oxide-siloxane copolymers, basic silicone oils or paraffins and also dyestuffs, pigments and flame-proofing agents.

The foam materials are produced in a manner known per se by mechanical or manual mixing of the components and lead to excellent foam materials having high mechanical values, a low degree of brittleness, good adhesion, satisfactory pore structure and a low tendency to shrinkage.

The usual processes are likewise used in the production of synthetic plastics and lacquers, generally with the concurrent use of the conventional chain extenders or cross-linking agents. Solid synthetic plastics can be obtained by preliminary extending with less or more than the equivalent quantity of polyisocyanate and subsequent vulcanization with, on the one hand, polyisocyanate and, on the other hand, components which are polyreactive with respect to isocyanate groups, such as water, polyalcohols, amino alcohols and polyamines. For the production of lacquer coatings, there are primarily used solutions of the polyisocyanates and of the polyesters to be employed according to the invention.

PRODUCTION OF THE STARTING MATERIALS

The esterification is effected under nitrogen in the presence of 0.2% of tert. butyl pyrocatechol as stabilizer of about 0.05% of titanium tetrabutylate as catalyst, finally over about six hours at the indicated temperatures and pressure conditions. The amine is added at about 30 to 40° C. over a period of about two hours, stirring is then carried on for about two hours at about 40° C. and for another two hours at 75° C. 12 mm. Hg.

The parts indicated are parts by weight. In the determination of the OH-number, NH-groups are included. The amino esters show no amide grouping according to the infra-red spectrum.

Various proportions and conditions are used in this production of starting materials as is indicated in the following preferred embodiment of A-1 to A-29.

A-1.—About 2120 parts of diethylene glycol, about 980 parts of maleic acid anhydride, about 170° C./100 mm. Hg; at about 40° C. about 1000 parts of cyclohexylamine; about 2888 parts of light yellow amino ester. Viscosity 5200 cp./25° C. 13.0% OH, acid number 12.4, 3.52% N.

A-2.—About 2400 parts of polyethylene glycol with a molecular weight of about 200; about 588 parts of maleic acid anhydride, about 180° C. 12 mm. Hg; at about 40° C. about 580 parts of cyclohexylamine; about 3440 parts of aminoester of dark brown color. Viscosity 1475 cp./25° C. 8.3% OH, acid number 3.1, 2.34% N.

A-3.—About 848 parts of diethylene glycol, about 392 parts of maleic acid anhydride, about 445 parts of adipic acid, 200° C./15 mm. Hg, about 1485 parts of polyester (OH-number 59.7; acid number 0.5); about 780 parts of this polyester reacted at about 50° C. with about 198 parts of cyclohexylamine; about 982 parts of yellowish aminoester; 5.0% OH, acid number 1.0.

A-4.—About 1660 parts of linear polypropylene glycol (OH-number 270), about 294 parts of maleic acid anhydride, 170° C./12 mm. Hg; about 300 parts of cyclohexylamine at about 40° C.; about 2175 parts of aminoester; 4.6% OH, acid number 19.6, 1.88% N.

A-5.—About 424 parts of diethylene glycol, about 196 parts of maleic acid anhydride, about 175° C./100 mm. Hg; about 210 parts of diethanolamine at about 70° C., about two hours at 100° C., four hours at about 120° C.; about 795 parts of aminoester. Viscosity 1240 cp./25° C., 18.6% OH, acid number 13.7, 3.50% N.

A-6.—About 848 parts of diethylene glycol, 196 parts of maleic acid anhydride, about 630 parts of adipic acid, about 200° C./12 mm. Hg; about 144 parts of piperidine added at about 70° C., four hours at 90° C., four hours at 120° C./12 mm. Hg; about 1575 parts of a light yellow aminoester. Viscosity 3840 cp./25° C. OH number 150, acid number 1.3, 1.29% N.

A-7.—About 1272 parts of diethylene glycol, about 98 parts of maleic acid anhydride, about 1460 parts of adipic acid, about 200° C./12 mm. Hg; about 99 parts of cyclohexylamine added at about 40° C.; about 2540 parts of aminoester, OH-number 68.7, acid number 3.3; 0.52% N. Viscosity 13,200 cp./25° C.

A-8.—About 2000 parts of a linear polypropylene glycol (OH-number 112), about 98 parts of maleic acid anhydride, 200° C./12 mm. Hg; about 90 parts of cyclohexylamine at about 30° C.; about 2165 parts of aminoester. Viscosity 603 cp./25° C. OH-number 103, acid number 5.6, 0.62% N, equivalent weight about 2960.

A-9.—(a) about 848 parts of diethylene glycol, about 196 parts of maleic acid anhydride, about 730 parts of adipic acid, about 200° C./15 mm. Hg; about 1548 parts of polyester. Viscosity about 8100 cp./25° C., OH-number 75.8, acid number 3.5.

(b) about 780 parts of polyester (a) 9–A, about 85 parts of piperidine at about 70° C., two hours at 70° C., two hours at 110° C./12 mm. Hg; aminoester. Viscosity 10,700 cp./25° C., OH-number 92, acid number 3.8, 1.47% N.

A-10.—About 780 parts of polyester (a) 9–A, about 95 parts of cyclohexylamine at about 40° C.; about 875 parts of aminoester. Viscosity 6150 cp./25° C. OH-number 132, acid number 3.7.

A-11.—About 3600 parts of polyethylene glycol of the molecular weight 200; about 882 parts of maleic acid anhydride, 170° C./12 mm. Hg at about 70° C., about 400 parts of dimethylamine are introduced in four hours, 2 hours at 70° C.; 2 hours at 100° C.; 2 hours at 110° C./12 mm. Hg, about 3170 parts of aminoester. Viscosity 1940 cp./25° C., 6.3% OH, acid number 2.4, 0.73% N.

A-12.—About 3000 parts of triethylene glycol, about 980 parts of maleic acid anhydride, 170° C./65 mm. Hg; about 830 parts of aniline at about 70° C., 2 hours at 70° C., 4 hours at 120° C./12 mm. Hg; about 4300 parts of aminoester; 9.7% OH, acid number 6.7; 2.23% N. Viscosity 2565 cp./25° C.

A-13.—About 600 parts of triethylene glycol, about 196 parts of maleic acid anhydride, about 170° C./60 mm. Hg; about 246 parts of imino-bis-propionitrile introduced dropwise at about 90° C., 2 hours at 90° C., 6 hours at 120° C.; about 1008 parts of aminoester. Viscosity 433 cp./25° C., 10.3% OH, acid number 8.4, 8.25% N.

A-14.—About 134 parts of trimethylol propane, about 1802 parts of diethylene glycol, about 2080 parts of adipic acid, about 98 parts of maleic acid anhydride, 200° C./12 mm. Hg; about 93 parts of cyclohexylamine at 40° C.; about 3130 parts of aminoester. Viscosity 2840 cp./25° C., OH-number 149, acid number 1.0, 0.44% N.

A-15.—About 648 parts of diethylene glycol, about 490 parts of maleic acid anhydride, 170° C./100 mm. Hg; about 450 parts of cyclohexylamine at about 40° C.; about 1533 parts of aminoester, 8.7% OH, acid number 43, 4.14% N.

A-16.—About 1000 parts of polyethylene glycol of the average molecular weight 200, about 392 parts of maleic acid anhydride, about 175° C./12 mm. Hg; about 380 parts of cyclohexylamine at about 40° C.; about 1700 parts of aminoester. Viscosity 23,200 cp./25° C., 6.5% OH, acid number 12.9, 3.14% N.

*A–17.*—About 424 parts of diethylene glycol, about 260 parts of itaconic acid, at about 170° C./100 mm. Hg; about 214 parts of benzylamine at about 40° C.; about 810 parts of aminoester. Viscosity 3290 cp./25° C., 13.1% OH, acid number 17, 3.5% N.

*A–18.*—About 360 parts of butane-1,4-diol, about 260 parts of itaconic acid, about 170° C./100 mm. Hg; about 180 parts of n-propylamine at about 40° C.; about 639 parts of aminoester. Viscosity 740 cp./25° C., 11.6% OH, acid number 14, 3.75% N.

*A–19.*—About 368 parts glycerine, about 232 parts fumaric acid at about 70° C./50 mm. Hg; about 118 parts of propylamine at about 40° C.; about 636 parts of aminoester. 24.8% OH, acid number 4.1, 4.25% N.

*A–20.*—About 440 parts of an adduct of propylene oxide and trimethylol propane (OH number 382), about 3000 parts of a linear polypropylene glycol (OH number 112) and about 294 parts of maleic acid anhydride, 200° C./12 mm. Hg; about 290 parts of cyclohexylamine at about 40° C.; about 3960 parts of amino ester. 3.5% OH, acid number 3.2, 1.02% N.

*A–21.*—About 318 parts of diethylene glycol, about 196 parts of maleic acid anhydride, 170° C./80 mm. Hg; about 200 parts of cyclohexylamine at 40 C.; about 684 parts of aminoester. Viscosity 29,850 cp./25° C., 10.6% OH, acid number 17, 4.25% N.

*A–22.*—About 800 parts of amino ester according to A–1, about 112 parts of propylene oxide introduced dropwise at 80° C., two hours at 80° C., two hours at about 110° C., then further treated at 110° C./12 mm. Hg; about 863 parts of modified amino ester. Viscosity 2000 cp./25° C., 12.9% OH, acid number 0.6, 3.34% N.

*A–23.*—About 800 parts of amino ester according to A–1, about 88 parts of ethylene oxide introduced at 80° C., two hours at 110° C., then one hour at 110° C./12 mm. Hg; about 852 parts of modified amino ester. 13.1% OH, acid number 1.8, 3.37% N. Viscosity 1980 cp./25° C.

*A–24.*—About 800 parts of amino ester according to A–1, about 112 parts of acrylonitrile added dropwise at about 80° C., about 4 hours at 80° C., about 4 hours at 120° C., about 4 hours at 120° C./12 mm. Hg; about 841 parts of modified amino ester. Viscosity 1870 cp./25° C., 11.1% OH, acid number 8.7, 4.92% N.

*A–25.*—About 1160 parts of amino ester according to A–2, about 112 parts of propylene oxide added dropwise at 75° C., two hours at 75° C., two hours at 75° C./12 mm. Hg; about 1230 parts of a modified amino ester. 7.9% OH, acid number 1.0, 2.19% N. Viscosity 1175 cp./25° C.

*A–26.*—About 1500 parts of amino ester according to A–15, about 130 parts of acrylonitrile added at 70° C., two hours at 70° C., two hours at 70° C./12 mm. Hg; about 1513 parts of modified amino ester. OH number 256, acid number 15.6, 4.55% N.

*A–27.*—About 1558 parts of aminoester according to A–2 are mixed at 75° C. with about 138 parts of acrylonitrile, left for about two hours at 80° C., and two hours at 80° C./12 mm. Hg; about 1611 parts of modified amino ester. Viscosity 1213 cp./25° C., 7.9% OH, acid number 3.3, 3.2% N.

*A–28.*—About 560 parts of distilled train fatty acid (molecular weight 280); (acid number 200), about 424 parts of diethylene glycol, about 294 parts of maleic acid anhydride, 170° C./30 mm. Hg; about 168 parts of propylamine added dropwise at 40° C., two hours at 40° C.; about 1341 parts of amino ester. Viscosity 2240 cp./25° C.

*A–29.*—About 1060 parts of diethylene glycol, about 490 parts of maleic acid anhydride, 200° C./200 mm. Hg; about 365 parts of n-butylamine at 50° C., 4 hours at 50° C. about 42 parts of hexamethylene diisocyanate introduced dropwise at about 60° C. into 365 parts of the amino ester, modified amino ester. Viscosity 5800 cp./25° C., 11.7% OH, acid number 2.8, 5.4% N.

*A–30.*—500 parts of the product A–6 are reacted at 70° C. with 60 parts of benzyl chloride. The mixture is stirred for 8 hours at 100° C. and then evacuated for 15 minutes to 12 mm. Hg at 120° C. A quaternised amino ester is obtained in an amount of 559 parts. Viscosity 1845 cp./25° C.; OH number 143; acid number 10.

*Example 1*

About 124 parts of amino ester A–4 are dissolved in about 124 parts of acetic ester. About 19.6 parts of a 45% acetic ester solution of an adduct of toluylene diisocyanate (2,4- and 2,6-isomers in the ratio 65:35) and trimethylol propane (NCO-content 17.6%) are then added and immediately brushed on. The combination hardens within about 30 minutes at room temperature into an elastic coating which is resistant to solvents.

*Example 2*

About 30.3 parts of amino ester A–4 are mixed with 8.7 parts of toluylene diisocyanate according to Example 1 and immediately poured into molds. After further heating for half an hour at about 80° C., an elastic molded element is obtained which is resistant to solvents.

*Examples 3–15*

The components (indicated in Table 1) (the numbers being parts by weight) are mixed mechanically and the foamable mixture placed in molds, in which a hard foam material forms with the physical properties (indicated in Table 2).

TABLE 1

| Example | A | B | C | D | E | F | G | H | I | K | L |
|---|---|---|---|---|---|---|---|---|---|---|---|
| 3 | 50—A-1 | 50 |  | 145 |  | 1 | 6 | 0.3 |  |  |  |
| 4 | 50—A-2 |  | 50 | 127 |  |  | 6 | 0.3 | 1 |  |  |
| 5 | 70—A-5 |  | 30 | 177 |  |  | 6 | 0.3 |  | 3 |  |
| 6 | 70—A-11 | 30 |  | 109 |  | 0.5 | 6 | 0.3 |  |  |  |
| 7 | 70—A-12 |  | 30 | 129 |  |  | 6 | 0.3 |  |  | 1.5 |
| 8 | 70—A-13 | 30 |  | 138 |  | 0.5 | 6 | 0.3 |  |  |  |
| 9 | 70—A-17 | 30 |  | 148 |  |  | 6 | 0.3 |  | 3 |  |
| 10 | 70—A-18 | 30 |  | 140 |  |  | 6 | 0.3 | 2 |  |  |
| 11 | 100—A-22 |  |  | 148 |  |  | 6 | 0.3 |  |  |  |
| 12 | 100—A-23 |  |  | 149 |  |  | 6 | 0.3 |  |  |  |
| 13 | 70—A-24 | 30 |  | 136 | 2 |  | 6 | 0.3 |  |  |  |
| 14 | 70—A-25 |  | 30 | 118 |  |  | 6 | 0.3 |  |  |  |
| 15 | 70—A-27 | 30 |  | 118 |  |  | 6 | 0.3 |  | 1.5 |  |

A—Amino ester as starting material.
B—Propylated trimethylol propane (OH number 380).
C—Polyester of adipic acid, phthalic acid anhydride, oleic acid and trimethylol propane (OH number 380).
D—Diphenylmethane-4,4'-diisocyanate.
E—Methylmorpholine.
F—Permethylated aminoethyl piperazine.
G—Sodium castor oil sulphate (50% water).
H—Polysiloxane polyalkylene glycol ester.
I—Ethyl morpholine.
K—Dimethyl benzylamine.
L—Permethylated diethylene triamine.

TABLE 2

| Example | A | B | C | D | E |
|---|---|---|---|---|---|
| 3 | 43 | 2.8 | 1.0 | 110 | 4.5 |
| 4 | 50 | 3.5 | 0.8 | 125 | 3.4 |
| 5 | 43 | 2.3 | 0.3 | 129 | 4.5 |
| 6 | 41 | 2.1 | 1.2 | 94 | 4.3 |
| 7 | 38 | 3.1 | 0.8 | 113 | 3.6 |
| 8 | 53 | 3.2 | 0.6 | 123 | 1.9 |
| 9 | 40 | 2.4 | 0.5 | 124 | 3.2 |
| 10 | 40 | 2.2 | 0.4 | 118 | 2.7 |
| 11 | 49 | 2.5 | 0.9 | 145 | 4 |
| 12 | 49 | 2.3 | 0.8 | 136 | 3.6 |
| 13 | 41 | 2.9 | 0.8 | 134 | 2 |
| 14 | 43 | 2.5 | 0.8 | 106 | 4.9 |
| 15 | 41 | 2.2 | 1.2 | 112 | 4.6 |

A—Weight per unit volume, kg./m.$^3$
B—Compressive strength, kg./cm.$^2$
C—Impact toughness, kg./cm.
D—Hot bending strength, ° C.
E—Water absorption, percent.

Example 16

About 100 parts by weight of amino ester A–4 are intimately mixed with about 0.2 part by weight of tin octoate, about 0.4 part by weight of dimethyl polysiloxane, about 1.0 part by weight of paraffin oil and about 2.6 parts by weight of water. After the subsequent addition, carried out while stirring, of about 38 parts by weight of toluylene diisocyanate (65% of 2,4-isomer and 35% of 2,6-isomer), the clouding mixture is poured into molds. A fine-pored elastic soft foam material is formed which has good tensile strength and breaking elongation and a low residual pressure-deformation.

Example 17

About 100 parts by weight of amino ester A–8 are intimately mixed with about 0.2 part by weight of tin octoate, about 1.2 parts by weight of a polysiloxane polyalkylene glycol ester and about 2.6 parts by weight of water and then about 40 parts by weight of toluylene diisocyanate (80% of 2,4-isomer and 20% of 2,6-isomer) are added while stirring. The mixture becomes cloudy after a short time and a soft fine-pored foam material is formed which has good tensile strength and breaking elongation and a low residual deformation.

Examples 18

100 parts of modified amino ester A–30 are mixed with 0.25 part of stannous octoate, 1 part of paraffin oil and 2.6 parts of water. 37 parts of toluylene diisocyanate of Example 1 are added. The reaction mixture expands and solidifies in a mold to give a semi-elastic foam with fine pores which is distinguished by increased water absorption.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane composition prepared by a process which comprises reacting an organic polyisocyanate with an amino ester, said amino ester having been prepared by addition of a primary or secondary amine at the point of $\alpha,\beta$-unsaturation of a polyester having a hydroxyl number from about 30 to 1200, said polyester having been prepared by a process which comprises reacting an $\alpha,\beta$-unsaturated carboxylic acid, an ester of an $\alpha,\beta$-unsaturated carboxylic acid or an anhydride of an $\alpha,\beta$-unsaturated carboxylic acid and a polyhydric alcohol.

2. The composition of claim 1 wherein said composition containing an amine unit is a monoamine.

3. The composition of claim 1 wherein said composition containing an amine unit is a polyamine.

4. A method for making a polyurethane which comprises reacting an organic polyisocyanate with an amino ester, said amino ester having been prepared by addition of a primary or secondary amine at the point of $\alpha,\beta$-unsaturation of a polyester having a hydroxyl number from about 30 to 1200, said polyester having been prepared by a process which comprises reacting an $\alpha,\beta$-unsaturated carboxylic acid, an ester of an $\alpha,\beta$-unsaturated carboxylic acid or an anhydride of an $\alpha,\beta$-unsaturated carboxylic acid and a polyhydric alcohol.

5. The process of claim 4 wherein said composition containing an amine unit is a monoamine.

6. The process of claim 4 wherein said composition containing an amine unit is a polyamine.

References Cited

UNITED STATES PATENTS

| | | | |
|---|---|---|---|
| 2,729,618 | 1/1956 | Muller et al. | 260—75 |
| 2,894,919 | 7/1959 | Simon et al. | 260—2.5 |
| 2,917,486 | 12/1959 | Nelson et al. | 260—45.9 |
| 2,969,335 | 1/1961 | Simons | 260—22 |
| 3,028,367 | 4/1962 | O'Brien | 260—77.5 |
| 3,035,025 | 5/1962 | Broadheat et al. | 260—75 |
| 3,051,687 | 8/1962 | Young et al. | 260—77.5 |
| 3,086,961 | 4/1963 | House et al. | 260—75 |
| 3,186,971 | 6/1965 | Hostettler et al. | 260—77.5 |

FOREIGN PATENTS

| | | |
|---|---|---|
| 227,705 | 4/1960 | Australia. |
| 791,853 | 3/1958 | Great Britain. |
| 858,757 | 1/1961 | Great Britain. |
| 1,017,001 | 1/1966 | Great Britain. |

OTHER REFERENCES

Alien Property Custodian; Ser. No. 397,741; Apr. 20, 1943, Paul Schlack.

DONALD E. CZAJA, *Primary Examiner.*

LEON J. BERCOVITZ, *Examiner.*

M. C. JACOBS, F. McKELVEY, *Assistant Examiner.*